United States Patent Office 3,040,082
Patented June 19, 1962

3,040,082
β-POLYHALO-α-HYDROXYISOCYANATES AND THEIR PREPARATION
Fred W. Hoover, Wilmington, Del., assignor to E. I. du Pont de Nemours and Company, Wilmington, Del., a corporation of Delaware
No Drawing. Filed Dec. 24, 1958, Ser. No. 782,673
12 Claims. (Cl. 260—453)

This invention relates to, and has as its principal objects provision of, novel β-polyhalo-α-hydroxy-isocyanates and a preparation of the same.

Isocyanates having α-hydroxyls have heretofore never been obtained. Jones and Powers, J. Am. Chem. Soc. 46, 2518 (1924) suggested that α-hydroxymethyl, α-hydroxyethyl, and α-hydroxybenzyl isocyanates might be intermediates in Lossen-Curtius-Hoffman rearrangements. Their work showed, however, that these compounds were not capable of existence.

Contrary to the teachings of the literature, there have now been obtained α-hydroxyisocyanates. These new compounds have at least two halogens on a β-carbon and result from the reaction of isocyanic acid with an aldehyde or ketone (i.e., oxo or ketaldone compound) having at least two halogens on an α-carbon. Particularly preferred compounds of this invention have the formula

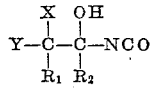

wherein X and Y are halogens, especially chlorine and/or fluorine; $R_1$ is hydrogen, halogen, hydrocarbon or halohydrocarbon; $R_2$ is hydrogen, hydrocarbon or halohydrocarbon; or $R_1$ and $R_2$ together are divalent hydrocarbon or halohydrocarbon radicals of 2–4 carbons. These particularly preferred compounds have between 3 and 11 carbons, inclusive, and contain halogen of atomic number 9–35, i.e., fluorine, chlorine and bromine.

The process whereby the new α-hydroxy-β-polyhalo-isocyanates are obtained involves the reaction of isocyanic acid with a carbonyl compound (i.e., aldehyde or ketone) having at least two halogens on α-carbons at a temperature below the decomposition temperature of the new compounds. The temperature varies for the specific compounds obtained but generally is below about 10° C. and preferably not above 0° C. The new α-hydroxyisocyanates are generally stored at low temperatures before their use.

The reaction involves the addition of isocyanic acid to the carbonyl compound in equimolar ratios. Carbonyl compounds that can be used in the above reaction are those of 2 to preferably not more than 10 carbons. The compounds generally used have the formula

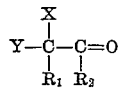

wherein the values of X, Y, $R_1$, and $R_2$ are those given previously. The following oxo compounds are useful in the process of this invention to form new α-hydroxyisocyanates: α,α-dichlorocyclohexanone, α,α-difluorocyclohexanone, perfluoroheptan-4-one, 1,1,1-tribromoacetone, tribromoacetaldehyde, dichlorofluoroacetaldehyde, α,α-dichlorocyclopentanone, and octafluorocyclopentanone.

The new compounds of this invention are highly reactive. In general they do not undergo polymerization reactions at 0° C. or below. Some of the compounds, particularly the fluorine-containing compounds, are stable at room temperature and can be distilled at reduced pressure at low temperatures. However, for most uses the new compounds need no purification. They can be prepared in or dissolved in inert solvents such as hydrocarbons and therein used for further reactions. The isocyanato group of the new compounds obtained by the process of this invention reacts with compositions containing an active hydrogen, e.g., alcohols and amines, to form hydroxyl-containing derivatives. They react with polymers, such as cotton or nylon, e.g., when fabric is dipped into a solution of the compound until the fabric contains about 1–2% of the compound, and subjected to baking at about 150° C. for 30 minutes, the fabric has increased water repellency. The compounds are herbicidal to grasses such as Johnson grass. They can also be converted to high molecular weight relatively inert polymers upon heating.

The following examples further illustrate the preparation and use of the new compounds of this invention.

EXAMPLE I

*Bis(Chlorodifluoromethyl)Hydroxymethyl Isocyanate*

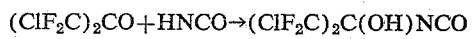

To s-dichlorotetrafluoroacetone (4.5 g.) cooled to —78° C. was added 1.2 g. of isocyanic acid. The resultant mixture was allowed to warm up slowly to room temperature. On distillation, 2.4 g. of bis(chlorodifluoromethyl)hydroxymethyl isocyanate, B.P. 26–27° C./7 mm., was obtained. The structure of this novel compound was confirmed by its infrared, near infrared and proton resonance spectra, nitrogen content and chemical behavior.

*Analysis.*—Calcd. for $C_4HO_2NF_4Cl_2$: N, 5.79. Found: N, 6.03.

Bis(chlorodifluoromethyl)hydroxymethyl isocyanate has utility as a plant growth modifier for many plants such as beans. For example, when applied as a 1% solution in acetone to the leaves of these plants, internode shortening occurs.

Bis(chlorodifluoromethyl)hydroxymethyl isocyanate was converted to the corresponding ureido derivatives by reaction with aniline. Aniline (3.72 g.) was added dropwise at —5° C. to a stirred mixture of 9.7 g. of bis(chlorodifluoromethyl)hydroxymethyl isocyanate and 25 ml. of ether. After standing overnight, removal of the solvent under reduced pressure left (95%) of 1-(bis(chlorodifluoromethyl)hydroxymethyl) - 3 - phenyl urea. It melted at 75–77° C. after recrystallization from carbon tetrachloride.

*Analysis.*—Calcd. for $C_{10}H_8O_2N_2F_4Cl_2$: N, 8.36; F, 22.68. Found: N, 8.82; F, 22.09.

1 - (bis(chlorodifluoromethyl)hydroxymethyl) - 3 - phenylurea is a herbicide, being particularly effective on grasses such as Johnson grass when applied in an acetone solution at the rate of 16 lbs./acre.

EXAMPLE II

*2,2,2-Trifluoro-1-Hydroxyethyl Isocyanate*

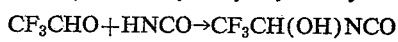

A mixture of 11.2 g. of trifluoroacetaldehyde and 5 g. of isocyanic acid was prepared at —78° C. and warmed slowly to 0° C. The infrared spectrum and the near infrared spectrum of this mixture clearly indicated that 2,2-2-trifluoro-1-hydroxyethyl isocyanate had been obtained. This hydroxyisocyanate underwent a rapid exothermic reaction at room temperature to form a viscous polymeric material. However, 2,2,2-trifluoro-1-hydroxyethyl isocyanate could be distilled from one trap to another at about 0° C.

Further evidence for the hydroxyisocyanate structure was shown by the formation of the corresponding ureido compounds. For example, to a mixture of 10.5 g. of 1-hydroxy-2,2,2-trifluoroethyl isocyanate, 10 ml. of ether and 5 ml. of carbon tetrachloride maintained at —15°

C. was added, 5.4 g. of aniline over a period of 30 minutes. The resultant mixture was allowed to stand overnight at room temperature and the solvent then removed under reduced pressure. There was obtained 10.6 g. (68%) of 1-(1-hydroxy-2,2,2-trifluoroethyl)-3-phenylurea. Both the infrared spectrum and the elemental analyses were in good agreement with this structure.

*Analysis.*—Calcd. for $C_9H_9O_2N_2Cl_3$: N, 9.88; Cl, 37.50. Found: N, 9.97; Cl, 37.52.

EXAMPLE III

*1H,5H-Octafluoro-1-Hydroxypentyl Isocyanate*

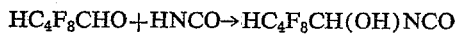

$$HC_4F_8CHO + HNCO \rightarrow HC_4F_8CH(OH)NCO$$

A mixture of 15.5 g. of 5H-perfluorovaleraldehyde and 2.9 g. of isocyanic acid, prepared at −78° C., was kept at 0° C. for 16 hours and then allowed to warm to room temperature. The near infrared spectrum of the product indicated that substantially all of the isocyanic acid had been converted to the hydroxyisocyanate and that virtually all of the carbonyl groups had undergone reaction.

The corresponding ureido derivative was formed as follows: A solution of aniline (5 g.) in ether (25 ml.) was added at −15° C. to a mixture of 1H,5H-octafluoro-1-hydroxypentyl isocyanate (13.7 g.) and 60 ml. of ether. The resultant mixture was allowed to stand for 72 hours. On evaporation of the solvent there remained 18 g. (98%) of 1-(1H,5H-octafluoro - 1 - hydroxypentyl)-3-phenylurea. Both the elemental analysis and the infrared spectrum were in good agreement with the ureido structure.

*Analysis.*—Calcd. for $C_{12}H_{10}O_2N_2F_8$: N, 7.65; F, 41.51. Found: N, 7.62; F, 41.22.

EXAMPLE IV

*1-Hydroxyhexafluorocyclobutyl Isocyanate*

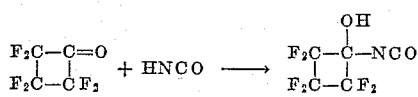

Isocyanic acid (2.5 g.) was distilled into a vessel containing 10 g. of perfluorocyclobutanone at −78° C. and the resultant mixture warmed slowly to room temperature. The near infrared spectrum of this product clearly showed that 1-hydroxyhexafluorocyclobutyl isocyanate had been formed. An attempt to distill 1-hydroxyhexafluorocyclobutyl isocyanate at 40° C. under reduced pressure gave a viscous liquid, presumably a low molecular weight polymer.

1-hydroxyhexafluorocyclobutyl isocyanate is useful to impart water and oil repellancy to fabrics such as cotton, nylon, and "Dacron" (Du Pont trademark for polyester fiber).

Perfluorocyclobutanone, a novel compound claimed elsewhere, may be prepared as follows:

*Step I.—Preparation of methyl trifluorovinyl ether.* A mixture of 33.3 g. (0.62 mole) of dry sodium methoxide and 155 g. of sodium-dried dioxane is placed in a 320-ml. stainless steel bomb. The bomb is sealed, pressured to 300 p.s.i. with tetrafluoroethylene, and heated to 100° C. under agitation. The bomb is repressured with tetrafluoroethylene as is necessary to maintain 300 p.s.i. of pressure. The reaction is continued until no further decrease in pressure occurs. The bomb is cooled and the exit gas is led into traps immersed in a Dry-Ice acetone bath. The greater portion of the recovered material boils below −20° C. but the trap residue is combined with the contents of the bomb and the combined material is distilled through a 12-inch Vigreux column. Material weighing 30.7 g. and boiling in the range 21–45° C. is collected. This material is redistilled through a 3-foot low temperature column packed with glass helices. Nineteen grams of methyl trifluorovinyl ether, boiling at 10.5–12.5° C., is collected. This product strongly reduces potassium permanganate solution and bromine.

*Step II.—Preparation of perfluorocyclobutyl methyl ether.* A thick-walled cylindrical glass reactor is cooled in a liquid nitrogen bath and charged with 11.5 parts of methyl trifluorovinyl ether, 0.5 part of phenothiazine inhibitor, about 0.5 part of a commercially available terpene stabilizer (see U.S. Patent 2,407,405) and 23 parts of tetrafluoroethylene. The reactor is then sealed and heated to 150° C. and held at this temperature for 12 hours. The sealed reactor is allowed to cool to room temperature, cooled to liquid nitrogen temperature, and finally opened to the atmosphere. The reactor is warmed carefully to vent any unreacted tetrafluoroethylene or any dimer thereof formed during the reaction. By work-up of the remaining liquid, there is obtained perfluorocyclobutyl methyl ether, a clear colorless liquid boiling at 56° C. at atmospheric pressure, $n_D^{25}=1.2875$.

*Step III.—Preparation of perfluorocyclobutanone hydrate.* A heavy-walled glass reactor is charged with eight parts of perfluorocyclobutyl methyl ether and 18.8 parts of concentrated sulfuric acid. The reactor and contents are cooled and the reactor sealed and heated at 150° C. for twelve hours. There is thus obtained 5.9 parts of perfluorocyclobutanone hydrate.

*Step IV.—Preparation of perfluorocyclobutanone.* A glass reactor fitted with a dropping funnel and connected to a trap cooled with a solid carbon-dioxide/actone bath is charged with 25 parts of phosphorus pentoxide. The reactor and attached system are then evacuated and filled with nitrogen at 200 mm. of mercury pressure. Molten perfluorocyclobutanone hydrate, 16.5 parts, is added through the dropping funnel. On warming the reactor an exothermic reaction occurs and perfluorocyclobutanone collected as a solid in the trap. The ketone boils at about 0–1° C.

EXAMPLE V

*1-Hydroxy-2,2,2-Trichloroethyl Isocyanate*

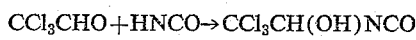

$$CCl_3CHO + HNCO \rightarrow CCl_3CH(OH)NCO$$

A mixture of 4.14 g. of isocyanic acid and 14.2 g. of chloral was prepared at −78° C. and then warmed to 0° C. and held at this temperature for several hours. The near infrared spectrum of samples taken periodically over a period of 24 hours showed that 1-hydroxy-2,2,2-trichloroethyl isocyanate gradually formed and that after 24 hours the reaction was substantially complete. Both the infrared spectrum and chemical evidence were in accord with the hydroxyisocyanate structure. 1-hydroxy-2,2,2-trichloroethyl isocyanate is a low-melting solid (M.P., 25° C.) which undergoes an exothermic reaction at room temperature, presumably to form low molecular weight polymeric materials. With aniline, it forms the corresponding ureido compound (M.P., 145° C.).

*Analysis.*—Calcd. for $C_9H_9O_2N_2Cl_3$: N, 9.88; Cl, 37.51. Found: N, 9.97; Cl, 37.52. This derivative was found to have utility as a herbicide; for example, when applied in acetone solution at rates as low as 2 lbs./acre, it was a pre-emergence herbicide, particularly for plants such as millet.

EXAMPLE VI

*2,2-Dichloro-1-Hydroxyethyl Isocyanate*

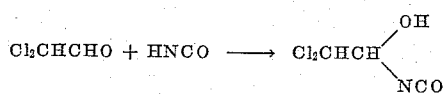

A mixture of 2.2 g. of isocyanic acid and 6.6 g. of dichloroacetaldehyde was prepared at −78° C. and warmed to 0° C. A clear, homogeneous product was obtained. The near infrared spectrum of this product showed that 2,2-dichloro-1-hydroxyethyl isocyanate had been formed.

EXAMPLE VII

*Bis(heptafluoropropyl)-1-Hydroxymethyl Isocyanate*

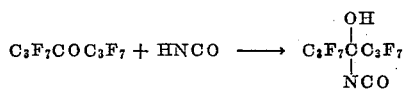

A mixture of 12.8 g. of perfluorodipropylketone and 1.4 g. of isocyanic acid was prepared at −80° C. and warmed to 0° C. The near infrared spectrum of the resultant liquid showed that bis(heptafluoropropyl)-1-hydroxymethyl isocyanate had formed.

EXAMPLE VIII

*Cyclic Derivatives of Hydroxyisocyanates*

Oxadiazinediones result from the reaction of hydroxy-isocyanates with themselves:

A. When 10.5 g. of 2,2,2-trichloro-1-hydroxyethyl isocyanate (Example V) in 9 ml. of dimethyl ether of ethylene glycol was stirred with 1 g. of water for an hour at 0° C., there was obtained a 30% yield of 6-trichloromethyl-1,3,5-oxadiazine-2,4-dione melting (with dec.) at 190–200° C.

*Analysis.*—Calcd. for $C_4H_3O_3N_2Cl_3$: C, 20.55; H, 1.30; N, 12.00; Cl, 45.60. Found: C, 20.68; H, 1.76; N, 12.03; Cl, 45.50.

B. To 1.63 g. of bis(chlorodifluoromethyl)hydroxymethyl isocyanate (Example I) was added a drop of pyridine at room temperature. An exothermic reaction took place with the formation of a white solid which was recrystallized from benzene. The 6,6-bis(chlorodifluoromethyl)-1,3,5-oxadiazine-2,4-dione melted at 98–99° C.

*Analysis.*—Calcd. for $C_5H_2Cl_2F_4N_2O_3$: C, 21.06; H, 0.71; N, 9.83; F, 26.65; M.W., 285. Found: C, 21.36; H, 0.99; N, 9.84; F, 26.35; M.W., 279.

These oxadiazinediones have herbicidal activity; e.g., when applied in an acetone solution at a rate of 2–16 lb./acre, growth of broad leaf plants and grasses such as Johnson grass was controlled.

Since obvious modifications in the invention will be evident to those skilled in the chemical arts, I propose to be bound solely by the appended claims.

The embodiments of the invention in which an exclusive property or privilege is claimed are defined as follows:

1. A compound of 3–11 carbon atoms having the formula

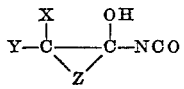

wherein X and Y are halogen and Z is at least one radical taken in sufficient number to satisfy the valences of the carbons to which it is attached selected from the group consisting of hydrogen, halogen and monovalent an divalent saturated aliphatic hydrocarbon and halohydrocarbon, no halogen being attached to the carbon alpha to the isocyanate group and all halogen in said compound being selected from the group consisting of fluorine, chlorine and bromine.

2. Bis(chlorodifluoromethyl)hydroxymethyl isocyanate.
3. 2,2,2-trifluoro-1-hydroxyethyl isocyanate.
4. 1H,5H-octafluoro-1-hydroxypentyl isocyanate.
5. 1-hydroxyhexafluorocyclobutyl isocyanate.
6. 1-hydroxy-2,2,2-trichloroethyl isocyanate.

7. The process of preparing a halogenated saturated aliphatic α-hydroxyisocyanate which comprises reacting isocyanic acid with a member of the group consisting of halogenated saturated aliphatic aldehydes and ketones of 2–10 carbons in which all substituents are selected from the group consisting of fluorine, chlorine and bromine and having at least two of such substituents on a carbon alpha to the carbonyl group at a temperature below about room temperature.

8. The process of preparing bis(chlorodifluoromethyl)-hydroxymethyl isocyanate which comprises reacting isocyanic acid with s-dichlorotetrafluoroacetone at a temperature below about room temperature.

9. The process of preparing 2,2,2-trifluoro-1-hydroxyethyl isocyanate which comprises reacting isocyanic acid with trifluoroacetaldehyde at a temperature below about 0° C.

10. The process of preparing 1H,5H-octafluoro-1-hydroxypentyl isocyanate which comprises reacting isocyanic acid with 5H-perfluorovaleraldehyde at a temperature below about room temperature.

11. The process of preparing 1-hydroxyhexafluorocyclobutyl isocyanate which comprises reacting isocyanic acid with perfluorocyclobutanone at a temperature below about room temperature.

12. The process of preparing 1-hydroxy-2,2,2-trichloroethyl isocyanate which comprises reacting isocyanic acid with chloral at a temperature below about 0° C.

References Cited in the file of this patent

UNITED STATES PATENTS

| | | |
|---|---|---|
| 2,706,733 | Reid | Apr. 19, 1955 |
| 2,883,388 | England | Apr. 21, 1959 |

OTHER REFERENCES

Jones et al.: Jour. Amer. Chem. Soc., vol. 46 (1924), p. 2519.

Bergmann: "The Chemistry of Acetylene and Related Compounds," 1948, p. 80.

Rodd: "Chemistry of Carbon Compounds," volume 1, part A, pp. 478–479.